United States Patent
Loc et al.

(10) Patent No.: US 9,813,988 B2
(45) Date of Patent: Nov. 7, 2017

(54) METHOD AND DEVICE FOR DATA TRANSMISSION IN WIRELESS LOCAL AREA NETWORK

(71) Applicant: Huawei Technologies Co., Ltd., Shenzhen, Guangdong (CN)

(72) Inventors: Peter Loc, Shenzhen (CN); Xun Yang, Shenzhen (CN); Tianyu Wu, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 9 days.

(21) Appl. No.: 14/573,569

(22) Filed: Dec. 17, 2014

(65) Prior Publication Data

US 2015/0103720 A1  Apr. 16, 2015

Related U.S. Application Data

(63) Continuation of application No. PCT/CN2013/075820, filed on May 17, 2013.

(30) Foreign Application Priority Data

Jun. 26, 2012 (CN) .......................... 2012 1 0213531

(51) Int. Cl.
*H04W 52/02* (2009.01)
*H04W 74/04* (2009.01)
(Continued)

(52) U.S. Cl.
CPC ... *H04W 52/0222* (2013.01); *H04W 52/0216* (2013.01); *H04W 72/0413* (2013.01);
(Continued)

(58) Field of Classification Search
CPC ......... H04W 52/0222; H04W 52/0212; H04W 52/02; H04W 72/0413; H04W 74/04;
(Continued)

(56) References Cited

U.S. PATENT DOCUMENTS 9,661,648 B2 * 5/2017 Gong ................ H04W 72/1231
2007/0104201 A1 5/2007 Wentink et al.
(Continued)

FOREIGN PATENT DOCUMENTS

CN 101366247 A 2/2009
CN 101461191 A 6/2009
(Continued)

*Primary Examiner* — Kwang B Yao
*Assistant Examiner* — Syed M Bokhari
(74) *Attorney, Agent, or Firm* — Leydig, Voit & Mayer, Ltd.

(57) ABSTRACT

Disclosed are methods and devices for data transmission in a wireless local area network. According to the embodiments of the present application, through transmitting by a terminal a first data frame to an access device, where the first data frame includes indication information and uplink data and the indication information is used to indicate a power save poll and uplink data transmission, the terminal can receive a second data frame which is transmitted by the access device according to the first data frame, where the second data frame includes response information of the power save poll indicated by the indication information. Since the first data frame carrying the uplink data indicates the power save poll simultaneously, downlink data from the access device can be inquired or requested at the same time of transmitting the uplink data, so that data transmission efficiency is improved.

8 Claims, 6 Drawing Sheets

A terminal transmits a first data frame to an access device, where the first data frame includes indication information and uplink data, and the indication information is used to indicate a power save poll and uplink data transmission  ⌒ 101

The terminal receives a second data frame which is transmitted by the access device according to the first data frame, where the second data frame includes response information of the power save poll indicated by the indication information  ⌒ 102

(51) Int. Cl.
*H04W 72/04* (2009.01)
*H04W 84/12* (2009.01)
*H04W 74/00* (2009.01)

(52) U.S. Cl.
CPC .......... *H04W 74/04* (2013.01); *H04W 74/002* (2013.01); *H04W 84/12* (2013.01); *Y02B 60/50* (2013.01)

(58) Field of Classification Search
CPC  H04W 52/0216; H04W 74/002; H04W 84/12
USPC .................................. 370/311, 338
See application file for complete search history.

(56) References Cited

U.S. PATENT DOCUMENTS

| | | | |
|---|---|---|---|
| 2007/0161364 A1 | 7/2007 | Surineni et al. | |
| 2007/0238438 A1 | 10/2007 | Alon et al. | |
| 2007/0281617 A1 | 12/2007 | Meylan et al. | |
| 2008/0056133 A1 | 3/2008 | Deshpande et al. | |
| 2008/0144558 A1* | 6/2008 | Wentink ............ | H04W 52/0216 370/311 |
| 2012/0257612 A1* | 10/2012 | Seok ................ | H04W 74/0816 370/338 |
| 2013/0155931 A1* | 6/2013 | Prajapati ............ | H04W 72/044 370/311 |
| 2013/0223419 A1* | 8/2013 | Ghosh ............... | H04W 52/0235 370/338 |

FOREIGN PATENT DOCUMENTS

| | | | |
|---|---|---|---|
| CN | 101512973 A | 8/2009 | |
| CN | 102711228 A | 10/2012 | |

* cited by examiner

METHOD AND DEVICE FOR DATA TRANSMISSION IN WIRELESS LOCAL AREA NETWORK

CROSS-REFERENCE TO RELATED APPLICATIONS

This application is a continuation of International Patent Application No. PCT/CN2013/075820, filed on May 17, 2013, which claims priority to Chinese Patent Application No. 201210213531.X, filed on Jun. 26, 2012, both of which are hereby incorporated by reference in their entireties.

TECHNICAL FIELD

The present disclosure relates to communication technologies and, in particular, to a method and a device for data transmission in a wireless local area network (Wireless Local Area Network, WLAN).

BACKGROUND

In a wireless local area network (Wireless Local Area Network, WLAN), when a terminal is in a power save (Power Save, PS) state, the terminal can transmit uplink data to an access device temporarily, or can also inquire or request downlink data from the access device by transmitting a PS poll (PS-Poll) frame. For example, in a wireless fidelity (Wireless Fidelity, WIFI) network, a WIFI station (Station, STA) can transmit uplink data to a WIFI access point (Access Point, AP) temporarily, or can also inquire or request downlink data from the AP.

However, data transmission efficiency of the prior art is relatively low.

SUMMARY

Aspects of the present disclosure provide a method and a device for data transmission in a wireless local area network, which are used to improve data transmission efficiency.

An aspect of the present disclosure provides a method for data transmission in a wireless local area network, including:

transmitting, by a terminal, a first data frame to an access device, where the first data frame includes indication information and uplink data, and the indication information is used to indicate a power save poll and uplink data transmission; and receiving, by the terminal, a second data frame which is transmitted by the access device according to the first data frame, where the second data frame includes response information of the power save poll indicated by the indication information.

Another aspect of the present disclosure provides a method for data transmission in a wireless local area network, including:

receiving, by an access device, a first data frame transmitted by a terminal, where the first data frame includes indication information and uplink data, and the indication information is used to indicate a power save poll and uplink data transmission; and transmitting, by the access device, a second data frame to the terminal according to the first data frame, where the second data frame includes response information of the power save poll indicated by the indication information.

Another aspect of the present disclosure provides a terminal, including:

a transmitter, configured to transmit a first data frame to an access device, where the first data frame includes indication information and uplink data, and the indication information is used to indicate a power save poll and uplink data transmission; and a receiver, configured to receive a second data frame which is transmitted by the access device according to the first data frame, where the second data frame includes response information of the power save poll indicated by the indication information.

An aspect of the present disclosure provides an access device, including:

a receiver, configured to receive a first data frame transmitted by a terminal, where the first data frame includes indication information and uplink data, and the indication information is used to indicate a power save poll and uplink data transmission; and a transmitter, configured to transmit a second data frame to the terminal according to the first data frame, where the second data frame includes response information of the power save poll indicated by the indication information.

It can be known from the technical solutions above that, according to the embodiments of the present disclosure, through transmitting by a terminal a first data frame to an access device, where the first data frame includes indication information and uplink data, and the indication information is used to indicate a power save poll and uplink data transmission, the terminal can receive a second data frame which is transmitted by the access device according to the first data frame, where the second data frame includes response information of the power save poll indicated by the indication information. Since the first data frame carrying the uplink data indicates the power save poll simultaneously, downlink data from the access device can be inquired or requested at the same time of transmitting the uplink data, so that data transmission efficiency is improved.

DESCRIPTION OF EMBODIMENTS

The term "and/or" herein shows only an association relationship for describing associated objects, and indicates that three relationships may exist, for example, A and/or B may indicate the following three cases: A exists alone, and both A and B exist, and B exists alone. In addition, the character "/" herein usually indicates that the former and later associated objects are in an "or" relationship.

Figure 1:
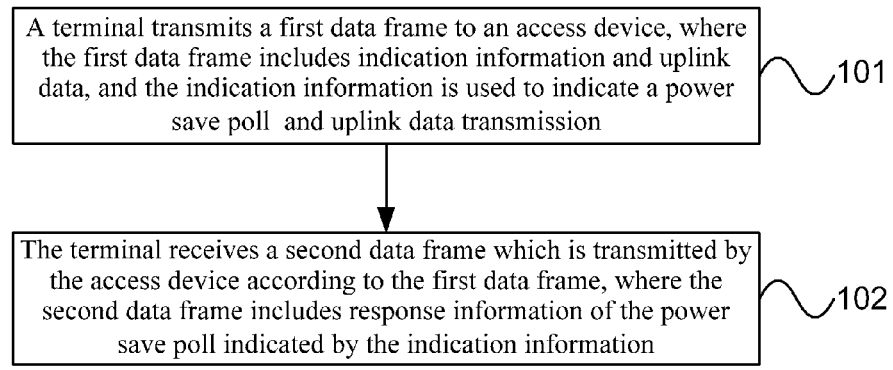
FIG. 1 is a schematic flow chart of a method for data transmission in a wireless local area network provided by an embodiment of the present disclosure.

FIG. 1 is a schematic flow chart of a method for data transmission in a wireless local area network provided by an embodiment of the present disclosure, as shown in FIG. 1.

At step 101, a terminal transmits a first data frame to an access device, where the first data frame includes indication information and uplink data, and the indication information is used to indicate a power save poll (PS-Poll) and uplink data transmission.

At step 102, the terminal receives a second data frame which is transmitted by the access device according to the first data frame, where the second data frame includes response information of the power save poll indicated by the indication information.

Optionally, in a possible implementation of this embodiment, in 101, the indication information included in the first data frame transmitted by the terminal can use a reserved value of an existing field to indicate.

For example, a type Type=10 (representing data) and a subtype Subtype=1101 in a frame control (Frame Control) field can be used to indicate the PS-Poll and the uplink data transmission.

For another example, a type Type=11 (representing extended data) and a subtype Subtype=0001 in a frame control (Frame Control) field can be used to indicate the PS-Poll and the uplink data transmission.

In some embodiments, a frame format of the first data frame can use a frame format in the prior art, in the frame control (Frame Control) field, a reserved value can be used to indicate the indication information then, reference may be made to relevant descriptions in the prior art for meanings of other fields, which will not be repeated herein.

Optionally, in a possible implementation of this embodiment, in step 101, the indication information included in the first data frame transmitted by the terminal can be specifically used to indicate the power save poll and uplink data transmission which does not have a quality of service (Quality of Service, QoS) characteristic.

Optionally, in a possible implementation of this embodiment, in step 101, the indication information included in the first data frame transmitted by the terminal can also be specifically used to indicate the power save poll and uplink data transmission which has a QoS characteristic.

For example, a type Type=11 (representing extended data) and a subtype Subtype=0001 in a frame control (Frame Control) field can be used to indicate the PS-Poll and the uplink data transmission which does not have the QoS characteristic; a type Type=11 (representing extended data) and a subtype Subtype=0010 in the frame control (Frame Control) field can be used to indicate the PS-Poll and the uplink data transmission which has the QoS characteristic.

Optionally, in a possible implementation of this embodiment, in step 101, the indication information included in the first data frame transmitted by the terminal can also use a value of a newly-added field to indicate.

Optionally, in a possible implementation of this embodiment, in step 102, the response information can include downlink data.

Optionally, in a possible implementation of this embodiment, in step 102, the response information can include first acknowledgement (Acknowledgement, ACK) information, where the first acknowledgement information is used to indicate whether the access device has downlink data which needs to be transmitted to the terminal.

Optionally, in a possible implementation of this embodiment, in step 102, when the first acknowledgement information indicates that the access device has the downlink data which needs to be transmitted to the terminal, after 102, the terminal can also further receive, according to the first acknowledgement information, a third data frame which is transmitted by the access device according to the first data frame, where the third data frame includes the downlink data.

Optionally, in a possible implementation of this embodiment, in 101, the first data frame transmitted by the terminal can also further include an acknowledgement policy (ACK Policy), and the acknowledgement policy includes:

no acknowledgement (No ACK); or
normal acknowledgement (Normal ACK); or
block acknowledgement (Block ACK).

In some embodiments, the acknowledgement policy can be included in a QoS field of an existing data frame format.

Correspondingly, when the acknowledgement policy is the normal acknowledgement (Normal ACK) or the block acknowledgement (Block ACK), in step 102, the second data frame received by the terminal can also further include second acknowledgement information of the uplink data, which is used to indicate that the uplink data is received correctly.

For example, if the uplink data included in the first data frame transmitted by the terminal is a single media access control protocol data unit (Media Access Control Protocol Data Unit, MPDU) and requires acknowledgement, then the acknowledgement policy needs to be set to the normal acknowledgement (Normal ACK).

For another example, if the uplink data included in the first data frame transmitted by the terminal is an aggregated MPDU (Aggregated MPDU, A-MPDU) and requires acknowledgement, then the acknowledgement policy needs to be set to the normal acknowledgement (Normal ACK) or the block acknowledgement (Block ACK).

For another example, if the uplink data included in the first data frame transmitted by the terminal does not require acknowledgement, then the acknowledgement policy needs to be set to no acknowledgement (No ACK).

Taking a WIFI network as an example, at the same time of transmitting the uplink data to an AP via the first data frame, an STA also utilizes the indication information to indicate the power save poll.

Figure 2:
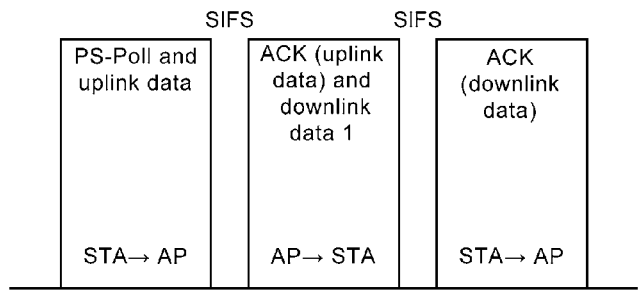
FIGS. 2-9 are schematic diagrams of data transmission manners in the embodiment corresponding to FIG. 1.
Figure 3:
Figure 4:
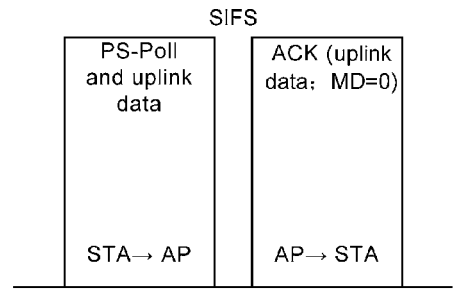

For example, the acknowledgement policy included in the first data frame is normal acknowledgement. After receiving the first data frame, the AP receives uplink data included in the first data frame correctly. Moreover, if the AP caches downlink data provided to the STA, and has prepared the downlink data within a short interframe space (Short Interframe Space, SIFS) time, then the AP replies the ACK of the uplink data and these downlink data to the STA; after the STA receives these downlink data, if the acknowledgement policy of these downlink data is normal ACK, then replying the ACK of these downlink data to the AP, as shown in FIG. 2;

if the AP caches downlink data provided to the STA, but failing to prepare the downlink data within the SIFS time, then the AP replies the ACK to the STA, and notifies in the ACK that the AP receives the uplink data correctly and there is cached downlink data (i.e. MD=1) of the STA but the downlink data needs to be transmitted to the STA after a certain time, after the certain time, the AP replies the downlink data to the STA, after the STA receives these downlink data, if the acknowledgement policy of these downlink data is normal ACK, then replying the ACK of these downlink data to the AP, as shown in FIG. 3;

if the AP does not cache downlink data of the STA, then the AP replies the ACK to the STA, and notifies in the ACK that the AP receives the uplink data correctly and there is no cached downlink data (i.e. MD=0) of the STA currently, as shown in FIG. 4.

For another example, the acknowledgement policy included in the first data frame is BA. Similar to the normal ACK, reference may be made to FIG. 2~FIG. 3, only the ACK therein being replaced with the BA.

Figure 5:
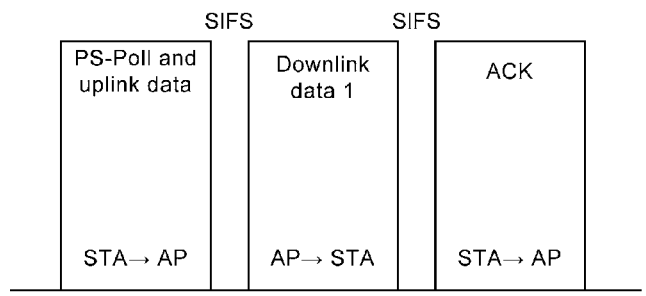
Figure 6:
Figure 7:
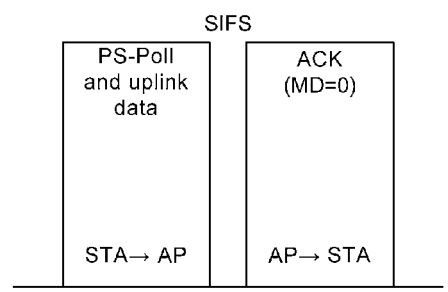

For another example, the acknowledgement policy included in the first data frame is no acknowledgement. After receiving the first data frame, the AP receives uplink data included in the first data frame correctly. Moreover, if the AP caches downlink data provided to the STA, and has prepared the downlink data within a short interframe space (Short Interframe Space, SIFS) time, then the AP replies these downlink data to the STA, after the STA receives these downlink data, if the acknowledgement policy of these downlink data is normal ACK, then replying the ACK of these downlink data to the AP, as shown in FIG. 5;

if the AP caches downlink data provided to the STA, but failing to prepare the downlink data within the SIFS time, then the AP replies the ACK to the STA, and notifies in the ACK that there is cached downlink data (i.e. MD=1) of the STA but the downlink data needs to be transmitted to the STA after a certain time, after the certain time, the AP replies the downlink data to the STA, after the STA receives these downlink data, if the acknowledgement policy of these downlink data is normal ACK, then replying the ACK of these downlink data to the AP, as shown in FIG. 6;

if the AP does not cache downlink data of the STA, then the AP replies the ACK to the STA, and notifies the STA in the ACK that there is no cached downlink data (i.e. MD=0) of the STA currently, as shown in FIG. 7.

Optionally, in a possible implementation of this embodiment, in step 101, the first data frame transmitted by the terminal can also further include a duration (Duration/ID) field, and the duration field is used to indicate the sum of time required by the terminal for transmitting the uplink data or receiving the downlink data.

Figure 8:
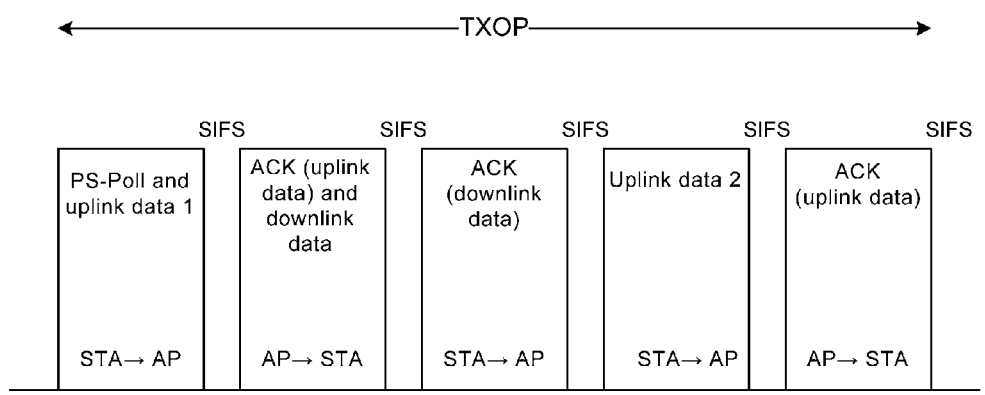
Figure 9:
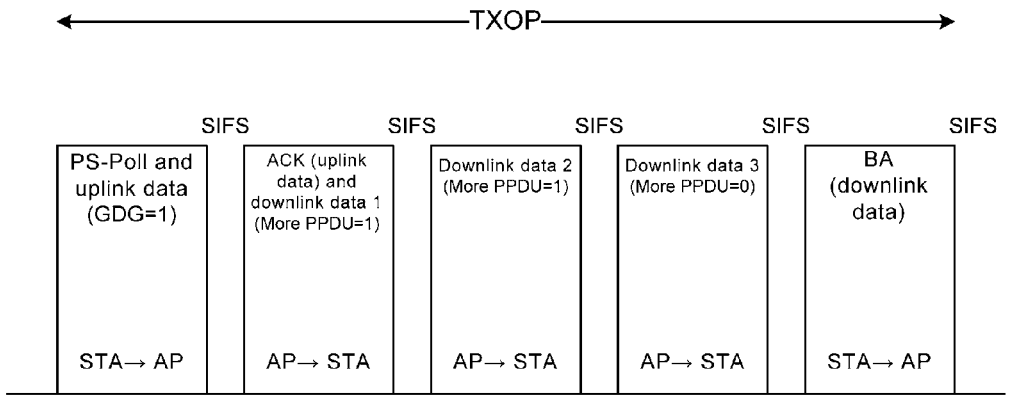

Specifically, within a time range indicated by the duration field, a transmit opportunity (Transmit opportunity, TXOP) can be obtained. Taking a WIFI network as an example, within a TXOP, the STA can transmit multiple uplink data frames to the AP, as shown in FIG. 8; or the STA can also utilize a reverse direction grant (Reverse Direction Grant, RDG) protocol, i.e. the first data frame can also further include an RDG message field, if the RDG message field indicates a support for the reverse direction transmit mechanism, i.e. RDG=1, then it is indicated that the AP is granted to transmit multiple downlink data frames to the STA, as shown in FIG. 9.

In this embodiment, by transmitting a first data frame to an access device by a terminal, where the first data frame includes indication information and uplink data, and the indication information is used to indicate a power save poll and uplink data transmission, the terminal can receive a second data frame which is transmitted by the access device according to the first data frame, where the second data frame includes response information of the power save poll indicated by the indication information. Since the first data frame carrying the uplink data indicates the power save poll simultaneously, downlink data from the access device can be inquired or requested at the same time of transmitting the uplink data, so that data transmission efficiency is improved.

Additionally, by using technical solutions of the present disclosure, a terminal in a power save state is enabled to finish transmitting uplink data and receiving downlink data within a time period as short as possible, thereby saving power of the terminal to the utmost.

Figure 10:
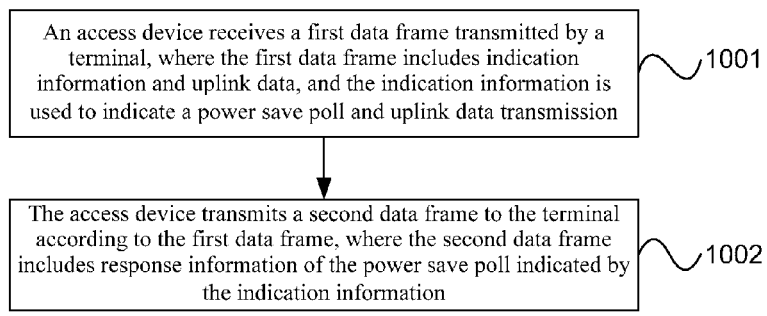
FIG. 10 is a schematic flow chart of a method for data transmission in a wireless local area network provided by another embodiment of the present disclosure.

FIG. 10 is a schematic flow chart of a method for data transmission in a wireless local area network provided by another embodiment of the present disclosure, as shown in FIG. 10.

At step 1001, an access device receives a first data frame transmitted by a terminal, where the first data frame includes indication information and uplink data, and the indication information is used to indicate a power save poll (PS-Poll) and uplink data transmission.

At step 1002, the access device transmits a second data frame to the terminal according to the first data frame, where the second data frame includes response information of the power save poll indicated by the indication information.

Optionally, in a possible implementation of this embodiment, in step 1001, the indication information included in the first data frame received by the access device can use a reserved value of an existing field to indicate. For example, a type Type=10 (representing data) and a subtype Subtype=1101 in a frame control (Frame Control) field can be used to indicate the PS-Poll and the uplink data transmission.

For another example, a type Type=11 (representing extended data) and a subtype Subtype=0001 in a frame control (Frame Control) field can be used to indicate the PS-Poll and the uplink data transmission.

In some embodiments, a frame format of the first data frame can use a frame format in the prior art, in the frame control (Frame Control) field, a reserved value can be used to indicate the indication information then, reference may be made to relevant descriptions in the prior art for meanings of other fields, which will not be repeated herein.

Optionally, in a possible implementation of this embodiment, in step 1001, the indication information included in the first data frame received by the access device can be specifically used to indicate the power save poll and the uplink data transmission which does not have a quality of service (Quality of Service, QoS) characteristic.

Optionally, in a possible implementation of this embodiment, in step 1001, the indication information included in the first data frame received by the access device can be specifically used to indicate the power save poll and the uplink data transmission which has a QoS characteristic.

For example, a type Type=11 (representing extended data) and a subtype Subtype=0001 in a frame control (Frame Control) field can be used to indicate the PS-Poll and the uplink data transmission which does not have the QoS characteristic; a type Type=11 (representing extended data) and a subtype Subtype=0010 in a frame control (Frame Control) field can be used to indicate the PS-Poll and the uplink data transmission which has the QoS characteristic.

Optionally, in a possible implementation of this embodiment, in step 1001, the indication information included in the first data frame received by the access device can also use a value of a newly-added field to indicate.

Optionally, in a possible implementation of this embodiment, in step 1002, the response information can include downlink data.

Optionally, in a possible implementation of this embodiment, in step 1002, the response information can include first acknowledgement (Acknowledgement, ACK) information, and the first acknowledgement information is used to indicate whether the access device has downlink data which needs to be transmitted to the terminal.

Optionally, in a possible implementation of this embodiment, in step 1002, when the first acknowledgement information indicates that the access device has the downlink data which needs to be transmitted to the terminal, after step 1002, the access device can also further transmit a third data frame to the terminal according to the first data frame, where the third data frame includes the downlink data.

Optionally, in a possible implementation of this embodiment, in step 1001, the first data frame received by the access device can also further include an acknowledgement policy (ACK Policy), and the acknowledgement policy includes:

no acknowledgement (No ACK); or
normal acknowledgement (Normal ACK); or
block acknowledgement (Block ACK).

In some embodiments, the acknowledgement policy can be included in a QoS field of an existing data frame format.

Correspondingly, when the acknowledgement policy is the normal acknowledgement (Normal ACK) or the block acknowledgement (Block ACK), in step 1002, the second data frame transmitted by the access device can also further include second acknowledgement information of the uplink data, which is used to indicate that the uplink data is received correctly.

For example, if the uplink data included in the first data frame received by the access device is a single media access control protocol data unit (Media Access Control Protocol Data Unit, MPDU) and requires acknowledgement, then the terminal needs to set the acknowledgement policy to the normal acknowledgement (Normal ACK).

For another example, if the uplink data included in the first data frame received by the access device is an aggregated MPDU (Aggregated MPDU, A-MPDU) and requires acknowledgement, then the terminal needs to set the acknowledgement policy to the normal acknowledgement (Normal ACK) or the block acknowledgement (Block ACK).

For another example, if the uplink data included in the first data frame received by the access device does not require acknowledgement, then the terminal needs to set the acknowledgement policy to no acknowledgement (No ACK).

Taking a WIFI network as an example, at the same time of transmitting the uplink data to an AP via the first data frame, an STA also utilizes the indication information to indicate the power save poll.

For example, the acknowledgement policy included in the first data frame is normal acknowledgement. After receiving the first data frame, the AP receives uplink data included in the first data frame correctly. Moreover, if the AP caches downlink data provided to the STA, and has prepared the downlink data within a short interframe space (Short Interframe Space, SIFS) time, then the AP replies the ACK of the uplink data and these downlink data to the STA, after the STA receives these downlink data, if the acknowledgement policy of these downlink data is normal ACK, then replying the ACK of these downlink data to the AP, as shown in FIG. 2;

if the AP caches downlink data provided to the STA, but failing to prepare the downlink data within an SIFS time, then the AP replies the ACK to the STA, and notifies in the ACK that the AP receives the uplink data correctly and there is cached downlink data (i.e. MD=1) for the STA but the downlink data needs to be transmitted to the STA after a certain time, after the certain time, the AP replies the downlink data to the STA, after the STA receives these downlink data, if the acknowledgement policy of these downlink data is normal ACK, then replying the ACK of these downlink data to the AP, as shown in FIG. 3;

if the AP does not cache downlink data of the STA, then the AP replies the ACK to the STA, and notifies in the ACK that the AP receives the uplink data correctly and there is no cached downlink data (i.e. MD=0) of the STA currently, as shown in FIG. 4.

For another example, the acknowledgement policy included in the first data frame is BA. Similar to the normal ACK, reference may be made to FIGS. 2-3, only the ACK therein being replaced with the BA.

For another example, the acknowledgement policy included in the first data frame is no acknowledgement. After receiving the first data frame, the AP receives uplink data included in the first data frame correctly. Moreover, if the AP caches downlink data provided to the STA, and has prepared the downlink data within a short interframe space (Short Interframe Space, SIFS) time, then the AP replies these downlink data to the STA, after the STA receives these downlink data, if the acknowledgement policy of these downlink data is normal ACK, then replying the ACK of these downlink data to the AP, as shown in FIG. 5;

if the AP caches downlink data provided to the STA, but failing to prepare the downlink data within an SIFS time, then the AP replies the ACK to the STA, and notifies in the ACK that there is cached downlink data (i.e., MD=1) for the STA but the downlink data needs to be transmitted to the STA after a certain time, after the certain time, the AP replies the downlink data to the STA, after the STA receives these downlink data, if the acknowledgement policy of these downlink data is normal ACK, then replying the ACK of these downlink data to the AP, as shown in FIG. 6;

if the AP does not cache downlink data of the STA, then the AP replies the ACK to the STA, and notifies in the ACK that there is no cached downlink data (i.e., MD=0) of the STA currently, as shown in FIG. 7.

Optionally, in a possible implementation of this embodiment, in 1001, the first data frame received by the access device can also further include a duration (Duration/ID) field, and the duration field is used to indicate the sum of time required by the terminal for transmitting the uplink data or receiving the downlink data.

Specifically, within a time range indicated by the duration field, a transmit opportunity (Transmit opportunity, TXOP) can be obtained. Taking a WIFI network as an example, within the TXOP, the STA can transmit multiple uplink data frames to the AP, as shown in FIG. 8; or the STA can also utilize a reverse direction grant (Reverse Direction Grant, RDG) protocol, i.e. the first data frame can also further include an RDG message field, if the RDG message field indicates a support for the reverse direction transmit mechanism, i.e. RDG=1, then it is indicated that the AP is granted to transmit multiple downlink data frames to the STA, as shown in FIG. 9.

In this embodiment, through receiving by an access device a first data frame which is transmitted by a terminal, where the first data frame includes indication information and uplink data and the indication information is used to indicate a power save poll and uplink data transmission, the access device can transmit a second data frame to the terminal according to the first data frame, where the second data frame includes response information of the power save poll indicated by the indication information. Since the first data frame carrying the uplink data indicates the power save poll simultaneously, downlink data from the access device can be inquired or requested at the same time of transmitting the uplink data, so that data transmission efficiency is improved.

Additionally, by using technical solutions of the present disclosure, a terminal in a power save state is enabled to finish transmitting uplink data and receiving downlink data within a time period as short as possible, thereby saving power of the terminal at the utmost.

In some embodiments, in order to describe the forgoing method embodiments in a simple way, the embodiments are expressed as a series of action combinations; however, a person skilled in the art should know that the present disclosure is not limited to the described action sequence because on the basis of the present disclosure, some steps may be performed in other sequences or performed at the same time. Secondly, a person of ordinary skill in the art should also know that the embodiments described in the specification are preferred embodiments, and the involved actions and modules are not indispensable parts of the present disclosure.

In the foregoing embodiments, each embodiment is described with a different emphasis; for the part not elaborated in an embodiment, reference may be made to related description in other embodiments.

Figure 11:
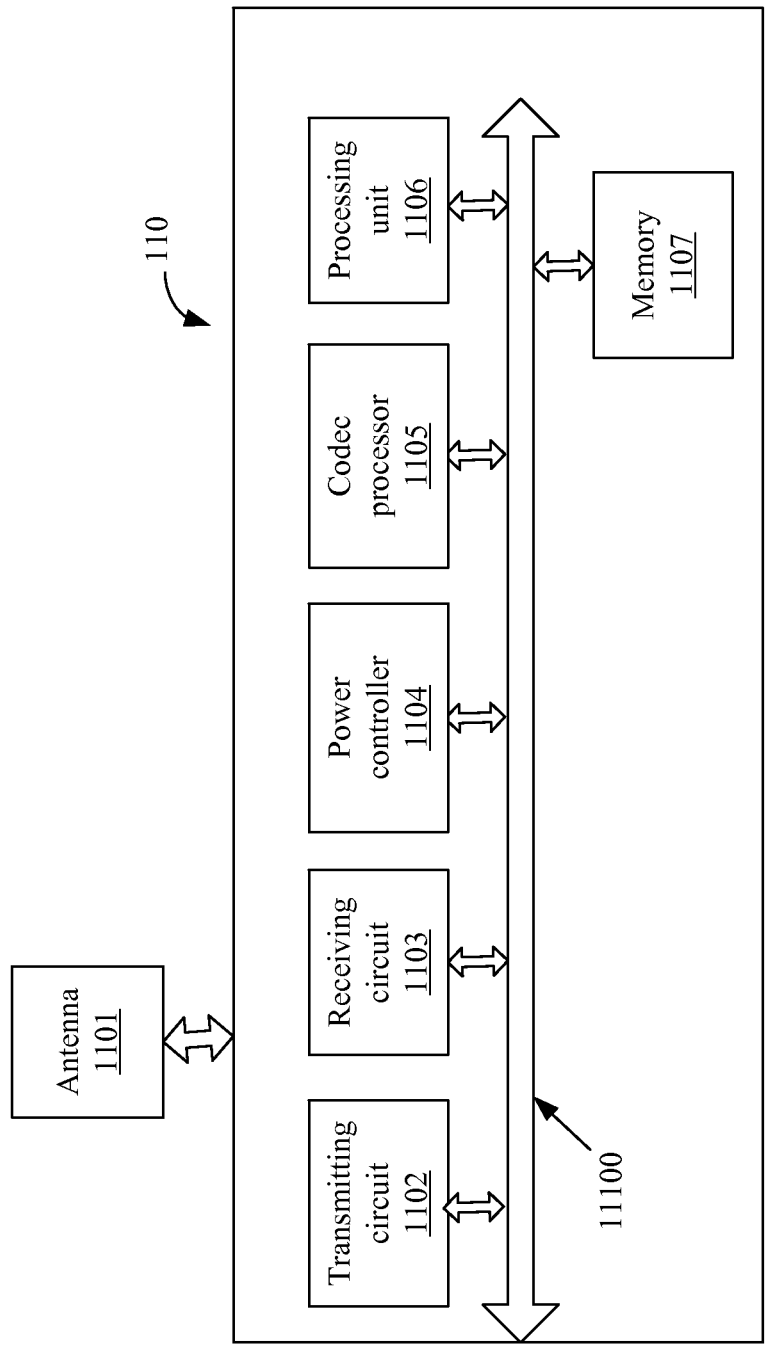
FIG. 11 is a schematic structural diagram of a device provided by another embodiment of the present disclosure.

Embodiments of the present disclosure further provide a device embodiment where steps and methods in the foregoing method embodiments are implemented. The embodiments of the present disclosure can be applied in a base station or a terminal of various communication systems. FIG. 11 is a schematic structural diagram of a device provided by another embodiment of the present disclosure, in this embodiment, a device 110 includes a transmitting circuit 1102, a receiving circuit 1103, a power controller 1104, a codec processor 1105, a processing unit 1106, a memory 1107 and an antenna 1101. The processing unit 1106 controls operations of the device 110, and the processing unit 1106 can also be referred to as a central processing unit (CPU). The memory 1107 can include a read-only memory and a random access memory, and provide instructions and data to the processing unit 1106. A part of the memory 1107 can also include a nonvolatile random access memory (NVRAM). In a particular application, the device 110 may be embedded in or may be in itself a wireless communication device such as a mobile phone and the like, and may also include a supporter holding the transmitting circuit 1102 and the receiving circuit 1103, so as to allow data transmission and reception between the device 110 and a remote device. The device 110 may also be a communication system device such as a base station etc. The transmitting circuit 1102 and the receiving circuit 1103 can be coupled to the antenna 1101. Components of the device 110 are coupled together via a bus system 11100, where the bus system 11100 includes a power bus, a control bus and a status signal bus in addition to a data bus. However, for a clear description, all types of buses are labeled as the bus system 11100 in the figure. The device 110 can also include the processing unit 1106 for processing signals, also includes the power controller 1104 and the codec processor 1105.

Methods as disclosed in the embodiments of the present disclosure above can be applied in the device 110. The processing unit 1106 can be an integrated circuit chip, having a signal processing capability. During an implementing process, steps of the above methods can be implemented via an integrated logic circuit in the form of hardware or instructions in the form of software in the processing unit 1106. These instructions can be implemented and controlled via coordination with the processing unit 1106. For performing the methods disclosed by the embodiments of the present disclosure, the described codec processor and the processing unit can be a general processor, a digital signal processor (DSP), an application specific integrated circuit (ASIC), a field-programmable gate array (FPGA) or other programmable logic devices, separate gates or transistor logic devices, separate hardware components. Methods, steps and logic block diagrams disclosed in the embodiments of the present disclosure can be implemented or executed. The general processor can be a microprocessor or the processor can also be any conventional processor, a decoder, etc. With reference to the steps of methods as disclosed in the embodiments of the present disclosure, it can be embodied directly as being executed by a hardware codec processor, or being executed by using a combination of hardware and software modules in the codec processor. A software module can reside in mature storage media in the art such as a random access memory, a flash memory, a read-only memory, a programmable read-only memory or an electrically erasable programmable memory, a register, etc. The store media locates at the memory 1107, a decode unit reads information in the memory 1107, and implements steps of the above methods with hardware thereof.

Figure 12:
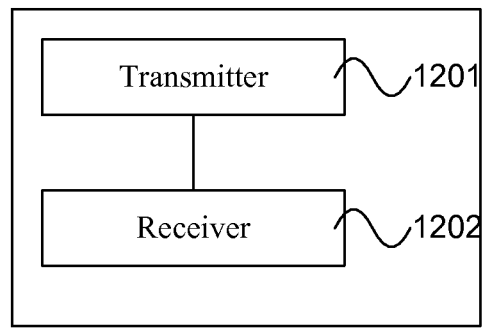
FIG. 12 is a schematic structural diagram of a terminal provided by another embodiment of the present disclosure.

FIG. 12 is a schematic structural diagram of a terminal provided by another embodiment of the present disclosure, as shown in FIG. 12, the terminal according to this embodiment can include a transmitter 1201 and a receiver 1202. The transmitter 1201 is configured to transmit a first data frame to an access device, where the first data frame includes indication information and uplink data, and the indication information is used to indicate a power save poll and uplink data transmission; the receiver 1202 is configured to receive a second data frame which is transmitted by the access device according to the first data frame, where the second data frame includes response information of the power save poll indicated by the indication information. The transmitter 1201 and the receiver 1202 can be respectively implemented by a transmitting circuit and a receiving circuit in the device 110 being coupled to an antenna. May be a user station STA in a wireless local area network, a user terminal etc.

Optionally, in a possible implementation of this embodiment, the response information included in the second data frame received by the receiver 1202 can specifically include downlink data or first acknowledgement information, where the first acknowledgement information is used to indicate whether the access device has downlink data which needs to be transmitted to the terminal; when the first acknowledgement information indicates that the access device has the downlink data which needs to be transmitted to the terminal, the receiver 1202 can also further receive, according to the first acknowledgement information, a third data frame which is transmitted by the access device according to the first data frame, where the third data frame includes the downlink data.

Optionally, in a possible implementation of this embodiment, the indication information included in the first data frame transmitted by the transmitter 1201 can be specifically used to indicate the power save poll and the uplink data transmission which does not have a QoS characteristic; or can also be used to indicate the power save poll and the uplink data transmission which has a QoS characteristic.

Optionally, in a possible implementation of this embodiment, the first data frame transmitted by the transmitter 1201 can also further include an acknowledgement policy, and the acknowledgement policy includes:
  no acknowledgement; or
  normal acknowledgement; or
  block acknowledgement.

Optionally, in a possible implementation of this embodiment, the second data frame received by the receiver 1202 can also further include second acknowledgement information of the uplink data, which is used to indicate that the uplink data is received correctly.

Optionally, in a possible implementation of this embodiment, the first data frame transmitted by the transmitter 1201 can also further include a duration field, and the duration field is used to indicate the sum of time required by the transmitter 1201 for transmitting second uplink data or receiving second downlink data.

In this embodiment, a terminal transmits a first data frame to an access device via a transmitter, where the first data frame includes indication information and uplink data and the indication information is used to indicate a power save poll and uplink data transmission, to enable a receiver to receive a second data frame which is transmitted by the access device according to the first data frame, where the second data frame includes response information of the power save poll indicated by the indication information. Since the first data frame carrying the uplink data indicates the power save poll simultaneously, downlink data from the access device can be inquired or requested at the same time of transmitting the uplink data, so that data transmission efficiency is improved.

Additionally, by using technical solutions of the present disclosure, a terminal in a power save state is enabled to finish transmitting uplink data and receiving downlink data within a time period as short as possible, thereby saving power of the terminal at the utmost.

Figure 13:
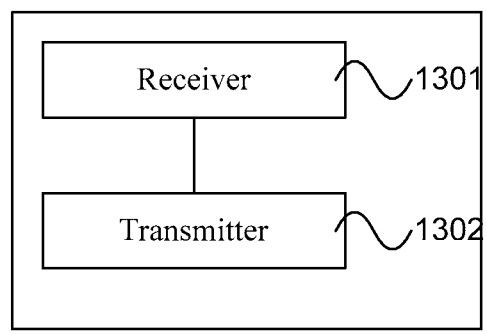
FIG. 13 is a schematic structural diagram of an access device provided by another embodiment of the present disclosure.

FIG. 13 is a schematic structural diagram of an access device provided by another embodiment of the present disclosure, as shown in FIG. 13, the access device according to this embodiment can include a receiver 1301 and a transmitter 1302. The receiver 1301 is configured to receive a first data frame transmitted by a terminal, where the first data frame includes indication information and uplink data and the indication information is used to indicate a power save poll and uplink data transmission; the transmitter 1302 is configured to transmit a second data frame to the terminal according to the first data frame, where the second data frame includes response information of the power save poll indicated by the indication information. The receiver 1301 and the transmitter 1302 can be respectively implemented by a transmitting circuit and a receiving circuit in the device 110 being coupled to an antenna. May be an access point in a wireless local area network.

Optionally, in a possible implementation of this embodiment, the response information indicated by the indication information included in the second data frame transmitted by the transmitter 1302 can specifically include downlink data or first acknowledgement information, and the first acknowledgement information is used to indicate whether the access device has downlink data which needs to be transmitted to the terminal; when the first acknowledgement information indicates that the access device has the downlink data which needs to be transmitted to the terminal, the transmitter 1302 can also further transmit a third data frame to the terminal according to the first data frame, where the third data frame includes the downlink data.

Optionally, in a possible implementation of this embodiment, the indication information included in the first data frame received by the receiver 1301 can be specifically used to indicate the power save poll and the uplink data transmission which does not have a QoS characteristic; or can also be used to indicate the power save poll and the uplink data transmission which has a QoS characteristic.

Optionally, in a possible implementation of this embodiment, the first data frame received by the receiver 1301 can also further include an acknowledgement policy, and the acknowledgement policy includes:
no acknowledgement; or
normal acknowledgement; or
block acknowledgement.

Optionally, in a possible implementation of this embodiment, the second data frame transmitted by the transmitter 1302 can also further include second acknowledgement information of the uplink data, which is used to indicate that the uplink data is received correctly.

Optionally, in a possible implementation of this embodiment, the first data frame received by the receiver 1301 can also further include a duration field, where the duration field is used to indicate the sum of time required by the terminal for transmitting the uplink data or receiving the downlink data.

In this embodiment, an access device receives via a receiver a first data frame which is transmitted by a terminal, where the first data frame includes indication information and uplink data and the indication information is used to indicate a power save poll and uplink data transmission, to enable a transmitter to transmit a second data frame to the terminal according to the first data frame, where the second data frame includes response information of the power save poll indicated by the indication information. Since the first data frame carrying the uplink data indicates the power save poll simultaneously, downlink data from the access device can be inquired or requested at the same time of transmitting the uplink data, so that data transmission efficiency is improved.

Additionally, by using technical solutions of the present disclosure, a terminal in a power save state is enabled to finish transmitting uplink data and receiving downlink data within a time period as short as possible, thereby saving power of the terminal at the utmost.

It may be clearly understood by a person skilled in the art that, for the purpose of convenience and concision of the description, reference may be made to corresponding processes in the foregoing method embodiments for a detailed working process of the described system, device and unit, which will not be repeated herein.

In the several embodiments provided in the present disclosure, it should be understood that the disclosed system, device, and method may be implemented in other manners. For example, the described device embodiments are merely illustrative. For example, the unit division is merely logical function division and may be other division in actual implementation. For example, a plurality of units or components may be combined or integrated into another system, or some features may be ignored or not performed. In addition, the shown or discussed mutual couplings or direct couplings or communication connections may be indirect couplings or communication connections through an interfaces, a device or a unit, and may be in electronic, mechanical, or other forms.

The units described as separate parts may or may not be physically separated, and parts shown as units may or may not be physical units, may be located in one position, or may be distributed on a plurality of network units. A part or all of the units may be selected according to actual needs to achieve the objectives of the solutions of the embodiments.

The integrated unit implemented in a form of a software functional unit as described above may be stored in a computer-readable storage medium. The described software functional unit is stored in a storage medium, and includes several instructions for enabling a computer device (which may be a personal computer, a server, or a network device) or a processor (processor) to perform a part of the steps of the methods described in the embodiments of the present disclosure. The foregoing storage medium includes: any medium that can store program codes, such as a USB disk, a mobile hard disk, a read-only memory (Read-Only Memory, ROM), a random access memory (Random Access Memory, RAM), a magnetic disk, or an optical disc.

What is claimed is:

1. A method for data transmission in a wireless local area network, comprising: transmitting, by a terminal, a first data frame to an access device, wherein the first data frame comprises indication information, a duration field, a reverse direction grant (RDG) message field, and uplink data, wherein the indication information is used to indicate a power save poll and uplink data transmission, the RDG message field indicates a support for reverse direction transmission so that the access device is granted to transmit multiple downlink data frames to the terminal, and the duration field is used to indicate a sum of time required by the terminal for receiving downlink data transmitted in the multiple downlink data frames to the terminal by the access device; and receiving, by the terminal, a second data frame that is transmitted by the access device within a time range indicated by the duration field according to the first data frame, wherein the second data frame comprises response information of the power save poll indicated by the indication information, and the response information comprises the downlink data.

2. The method according to claim 1, wherein the indication information comprised in the first data frame is used to indicate:
the power save poll and uplink data transmission which does not have a quality of service (QoS) characteristic; or
the power save poll and uplink data transmission which has a QoS characteristic.

3. A method for data transmission in a wireless local area network, comprising: receiving, by an access device, a first data frame transmitted by a terminal, wherein the first data frame comprises indication information, a duration field, a reverse direction grant (RDG) message field, and uplink data, wherein the indication information is used to indicate a power save poll and uplink data transmission, the RDG message field indicates a support for reverse direction transmission so that the access device is granted to transmit multiple downlink data frames to the terminal, and the duration field is used to indicate a sum of time required by the terminal for receiving downlink data transmitted in the multiple downlink data frames to the terminal by the access device; and transmitting, by the access device, a second data frame to the terminal within a time range indicated by the duration field according to the first data frame, wherein the second data frame comprises response information of the power save poll indicated by the indication information, wherein the response information comprises the downlink data.

4. The method according to claim 3, wherein the indication information comprised in the first data frame is used to indicate:
the power save poll and uplink data transmission which does not have a quality of service (QoS) characteristic; or
the power save poll and uplink data transmission which has a QoS characteristic.

5. A terminal, comprising: a transmitter, configured to transmit a first data frame to an access device, wherein the first data frame comprises indication information, a duration field, a reverse direction grant (RDG) message field, and uplink data, wherein the indication information is used to indicate a power save poll and uplink data transmission, the RDG message field indicates a support for reverse direction transmission so that the access device is granted to transmit multiple downlink data frames to the terminal, and the duration field is used to indicate a sum of time required by the terminal for receiving downlink data transmitted in the multiple downlink data frames to the terminal by the access device; and a receiver, configured to receive a second data frame which is transmitted by the access device within a time range indicated by the duration field according to the first data frame, wherein the second data frame comprises response information of the power save poll indicated by the indication information, wherein the response information comprises the downlink data.

6. The terminal according to claim 5, wherein the indication information comprised in the first data frame transmitted by the transmitter is used to indicate:
the power save poll and uplink data transmission which does not have a quality of service (QoS) characteristic; or
the power save poll and uplink data transmission which has a QoS characteristic.

7. An access device, comprising: a receiver, configured to receive a first data frame transmitted by a terminal, wherein the first data frame comprises indication information, a duration field, a reverse direction grant (RDG) message field, and uplink data, wherein the indication information is used to indicate a power save poll and uplink data transmission, the RDG message field indicates a support for reverse direction transmission so that the access device is granted to transmit multiple downlink data frames to the terminal, and the duration field is used to indicate a sum of time required by the terminal for receiving downlink data transmitted in the multiple downlink data frames to the terminal by the access device; and a transmitter, configured to transmit a second data frame to the terminal within a time range indicated by the duration field according to the first data frame, wherein the second data frame comprises response information of the power save poll indicated by the indication information, wherein the response information comprises the downlink data.

8. The access device according to claim 7, wherein the indication information comprised in the first data frame received by the receiver is configured to indicate:
the power save poll and uplink data transmission which does not have a quality of service (QoS) characteristic; or
the power save poll and uplink data transmission which has a QoS characteristic.

* * * * *